US009069053B2

(12) United States Patent
Bamberger et al.

(10) Patent No.: US 9,069,053 B2
(45) Date of Patent: Jun. 30, 2015

(54) METHOD FOR THE COMPUTER-ASSISTED PROCESSING OF MEASUREMENTS OF FEATURES IN A RADIO NETWORK

(75) Inventors: Joachim Bamberger, Krailling (DE); Marian Grigoras, Neubiberg (DE); Andrei Szabo, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 802 days.

(21) Appl. No.: 13/265,734

(22) PCT Filed: Apr. 12, 2010

(86) PCT No.: PCT/EP2010/054751
§ 371 (c)(1),
(2), (4) Date: Oct. 21, 2011

(87) PCT Pub. No.: WO2010/121915
PCT Pub. Date: Oct. 28, 2010

(65) Prior Publication Data
US 2012/0033572 A1 Feb. 9, 2012

(30) Foreign Application Priority Data

Apr. 22, 2009 (EP) .................................... 09005659
Nov. 26, 2009 (DE) .......................... 10-2009-055871

(51) Int. Cl.
*G01R 31/08* (2006.01)
*G01S 5/00* (2006.01)
*G01S 5/02* (2010.01)

(52) U.S. Cl.
CPC ............. *G01S 5/0081* (2013.01); *G01S 5/0205* (2013.01)

(58) Field of Classification Search
None
See application file for complete search history.

(56) References Cited

U.S. PATENT DOCUMENTS

2003/0130997 A1   7/2003  Enewoldsen et al. ............. 707/3
2005/0032531 A1*  2/2005  Gong et al. ................ 455/456.5
(Continued)

FOREIGN PATENT DOCUMENTS

DE        10200604 A1    7/2003  ............. G06F 17/30
DE    102006044293 A1   10/2007  ............... H04Q 7/38
(Continued)

OTHER PUBLICATIONS

International PCT Search Report and Written Opinion, PCT/EP2010/0054751, 16 pages.
(Continued)

*Primary Examiner* — Christine Duong
(74) *Attorney, Agent, or Firm* — Slayden Grubert Beard PLLC

(57) ABSTRACT

In a method for the computer-assisted processing of measurements of features in a radio network, each of a plurality of measurements is associated with a base station and describes a feature of a field transmitted by a mobile object at the associated base station and/or a field transmitted by the associated base station at the mobile object. A plurality of evaluation units communicate with the base stations, one or more base stations of the radio network being associated with each evaluation unit. The evaluation units evaluate features in the radio network, a suitable evaluation unit always being determined by the position of the mobile object to evaluate the features. Since the feature evaluation is distributed, not all evaluated data in the network is lost in case an evaluation unit breaks down. In addition, using multiple evaluation units ensures that enough computer capacity is available to process the measurements in the method.

19 Claims, 1 Drawing Sheet

(56) References Cited

U.S. PATENT DOCUMENTS

2006/0286961 A1    12/2006  Levitan ...................... 455/404.2
2008/0225810 A1*   9/2008   Buchwald et al. ............ 370/338
2008/0306690 A1*   12/2008  Huang .......................... 701/300
2010/0103048 A1    4/2010   Bamberger et al. ........... 342/451

FOREIGN PATENT DOCUMENTS

EP     1289331 A2     3/2003    ............... H04Q 7/38
WO     2004/019559 A2 3/2004    ............... H04L 12/28

OTHER PUBLICATIONS

Parodi, B. et al., "Algebraic and Statistical Conditions for Use of SLL", ECC-2007—European Control Conference, Kos, Greece; 7 pages.

Parodi, B. et al., "Initialization and Online-Learning of RSS Maps for Indoor/Campus Localization", IEEE/ION Position, Location and Navigation Symposium, San Diego, California; pp. 164-172.

* cited by examiner

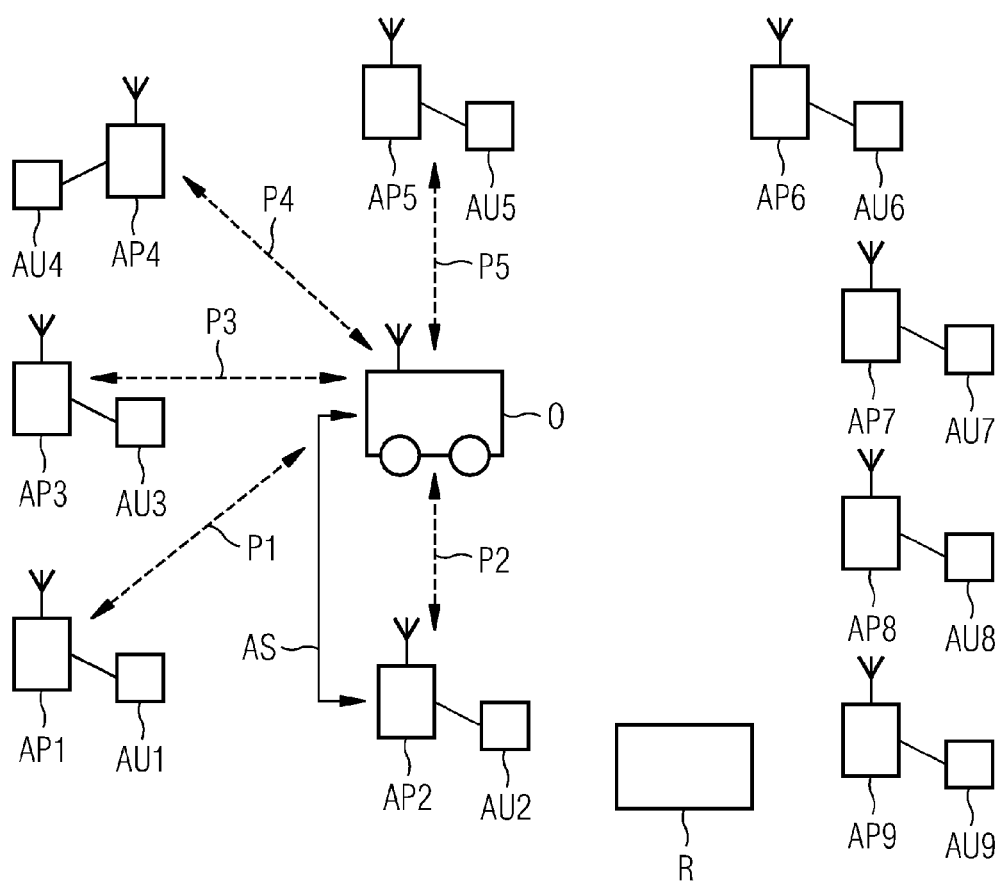

METHOD FOR THE COMPUTER-ASSISTED PROCESSING OF MEASUREMENTS OF FEATURES IN A RADIO NETWORK

CROSS-REFERENCE TO RELATED APPLICATIONS

This application is a U.S. National Stage Application of International Application No. PCT/EP2010/054751 filed Apr. 12, 2010, which designates the United States of America, and claims priority to EP Application No. 09005659.9 filed Apr. 22, 2009 and German Application No. 10 2009 055 871.3 filed Nov. 26, 2009. The contents of which are hereby incorporated by reference in their entirety.

TECHNICAL FIELD

The invention relates to a method for the computer-supported processing of measurements of features of a radio network and to a corresponding communication network.

BACKGROUND

Various methods for localizing mobile objects are known from the prior art based on measured features of a radio network. The radio network therein includes a multiplicity of stationary base stations that transmit signals or, as the case may be, receive signals wirelessly. A mobile object able likewise to receive or, as the case may be, transmit signals wirelessly moves within the radio network. The mobile object's location can then be determined by way of corresponding features or, as the case may be, parameters of the fields transmitted by the base stations or, as the case may be, mobile object. For example the signal strength of the field transmitted by the mobile object, which field is measured by the base stations or, as the case may be, the signal strength of the fields of the individual base stations at the mobile object's location can be used for determining the location. The mobile object can be localized also by way of the propagation time of field signals or, as the case may be, wave-propagation directions. Localizing methods are therein employed that are based on triangulation or on theoretical or adapted wave-propagation models, or on what is termed pattern matching. Pattern matching is suitable particularly for localizing within rooms or buildings and employs a feature map which for a multiplicity of grid points in the room contains corresponding features of the radio network in the form of, for instance, signal field strengths when the mobile object is located at a corresponding grid point. The mobile object's location can then be estimated by comparing the features in the feature map with the radio network's actually measured features.

As well as for localizing a mobile object, a radio network's measured features can be used also for generating the aforementioned feature map. Methods that describe generating corresponding feature maps by means of learning techniques are known therein from the prior art. Instances of such techniques can be found in publications [1], [2], and [3].

With known methods in which features of a radio network are processed for localizing a mobile object or generating feature maps, those signals are evaluated in an individual computing unit that can be integrated in, for example, the mobile object or a base station. It is possible also to use a separate, central computing unit to which all the measured features are conveyed for evaluating. It has here proved disadvantageous that the entire process will be terminated if the computing unit fails, with any already acquired information then being lost. Extending that method to cover larger localizing areas by adding more base stations or mobile objects is subject moreover to reservations as that will greatly increase the necessary computing power which will hence no longer be provided in a reasonable time by an individual computing unit.

SUMMARY

According to various embodiments, a method for the computer-supported processing of measurements of features of a radio network as well as a corresponding communication network can be provided which will both respond robustly to outages and can be flexibly employed for radio networks of different sizes.

According to an embodiment, in a method for the computer-supported processing of measurements of features of a radio network, the radio network including a plurality of base stations and one or more mobile objects and with measurements being performed for a respective mobile object, each measurement being assigned to a base station and describing a feature of a field transmitted by the respective mobile object at the associated base station and/or a field transmitted by the associated base station at the respective mobile object, with a plurality of evaluation units which communicate with the base stations being provided and each evaluation unit being assigned one or more base stations of the radio network, the method comprising for a respective mobile object:
a) one base station being selected from the plurality of base stations in such a way as to ensure reception of the field transmitted by the respective mobile object at the selected base station and/or reception of the field transmitted by the selected base station at the respective mobile object;
b) measurements being conveyed to the evaluation unit assigned to the selected base station, which measurements are assigned to the base stations that receive the field transmitted by the respective mobile object and/or whose field is received by the respective mobile object;
c) the evaluation unit assigned to the selected base station evaluating the conveyed measurements or specifying an evaluation unit for evaluating the conveyed measurements, whereupon the conveyed measurements will be evaluated in the specified evaluation unit.

According to a further embodiment, the fields of a WLAN network and/or DECT network and/or mobile-radio network can be evaluated. According to a further embodiment, signal strengths and/or propagation times and/or propagation angles of the fields in the radio network can be determined via the measurements. According to a further embodiment, the base station with which the respective mobile object is associated in the radio network can be selected at step a) as the base station. According to a further embodiment, a measurement of a base station may include a feature—measured by the base station—of a field transmitted by the respective mobile object at the base station, with a respective base station administering a neighborhood list containing base stations which according to a neighborhood criterion are adjacent to the respective base station. According to a further embodiment, the neighborhood criterion can be defined such that a neighborhood list of a respective base station contains all the base stations whose respective reception-range area for the field of the respective mobile object overlaps the reception-range area of the respective base station for the field of the respective mobile object. According to a further embodiment, it is filed in the neighborhood list of a respective base station whether a base station or, as the case may be, which base station in the neighborhood list is associated with the respective mobile object, with a respective base station sending all the base stations in its neighborhood list a message if the respective mobile object and respective base station are associated, as a result of which the base stations in the neighborhood list will be informed of which base station is the selected base station;

a respective base station conveying a feature—measured by it—of the field transmitted by the respective mobile object to the base station in its neighborhood list which according to the neighborhood list is associated with the mobile object, provided the neighborhood list includes a base station associated with the respective mobile object.

According to a further embodiment, when a respective base station measures a feature of the field transmitted by the respective mobile object, the respective base station will inform all the base stations in its neighborhood list about the presence of the mobile object and about the measured feature, whereupon as the selected base station a base station will be specified from among the base stations which measure a feature of the field transmitted by the respective mobile object. According to a further embodiment, the base station having measured the greatest signal strength of the field transmitted by the respective mobile object will be specified as the selected base station. According to a further embodiment, a respective base station will only inform all the base stations in its neighborhood list about the presence of the mobile object and about the measured feature if its neighborhood list does not contain any base stations associated with the respective mobile object. According to a further embodiment, a measurement of a base station may include a feature—measured by the respective mobile object—of a field transmitted by the base station at the respective mobile object, with the features measured in the respective mobile object being conveyed by the respective mobile object to the evaluation unit assigned to the selected base station. According to a further embodiment, the evaluation unit assigned to the selected base station may specify as a function of one or more defined criteria an evaluation unit for evaluating the conveyed measurements, with the defined criterion/criteria particularly taking the resources available on the evaluation units into account in such a way that those having more resources are more likely to be specified for evaluating the measurements. According to a further embodiment, configuration data required for evaluating the measurements can be distributed locally among the evaluation units so that each evaluation unit will contain at least the configuration information which it requires for evaluating the conveyed measurements. According to a further embodiment, the conveyed measurements can be evaluated in the corresponding evaluation unit in such a way that the location of the respective mobile object will be determined and/or at least a part of a feature map will be generated and learned in particular based on a learning technique, with the feature map—for a plurality of grid points in the room—indicating the radio network's features when the respective mobile object is located at the grid point. According to a further embodiment, each evaluation unit may be responsible for a defined partial area of the feature map and generates and in particular learns the feature map in said partial area. According to a further embodiment, the defined partial areas at least partially overlap, with evaluation units that are responsible for mutually overlapping partial areas exchanging their evaluations in the partial areas' overlap zones, with one evaluation unit taking account of the evaluations originating from another evaluation unit in the overlap zone when the feature map is being generated. According to a further embodiment, one or more interfaces can be provided via which the evaluations of the evaluation units can be retrieved. According to a further embodiment, the evaluation units' evaluations can be retrieved by intermediately connecting a central computer. According to a further embodiment, the evaluation units may form a peer-to-peer network and evaluations of the evaluation units can be retrieved on a decentralized basis via requests to the peer-to-peer network. According to a further embodiment, the measurements can be evaluated via evaluation units that are each assigned to an individual base station and are in particular part of an individual base station.

According to another embodiment, a communication network for the computer-supported processing of measurements of features of a radio network, including a plurality of base stations and one or more mobile objects, with the plurality of base stations and the mobile object(s) forming the radio network, with measurements being performed for a respective mobile object while the radio network is operating, with each measurement being assigned to a base station and describing a feature of a field transmitted by the respective mobile object at the associated base station and/or of a field transmitted by the associated base station at the respective object, may comprise a plurality of evaluation units networked with the base stations and each evaluation unit being assigned one or more base stations of the radio network, with the communication network being embodied such that for a respective mobile object: a) one base station is selected from the plurality of base stations in such a way as to ensure reception of the field transmitted by the respective mobile object at the selected base station and/or reception of the field transmitted by the selected base station at the respective mobile object; b) measurements are conveyed to the evaluation unit assigned to the selected base station, which measurements are assigned to the base stations that receive the field transmitted by the respective mobile object and/or whose field is received by the respective mobile object; c) the evaluation unit assigned to the selected base station evaluates the conveyed measurements or specifies an evaluation unit for evaluating the conveyed measurements, whereupon the conveyed measurements will be evaluated in the specified evaluation unit.

According to a further embodiment, the communication network may be embodied such that one of the methods as described above can be performed in the communication network.

BRIEF DESCRIPTION OF THE DRAWINGS

An exemplary embodiment is described in detail below with the aid of attached FIG. 1. Said FIGURE is a schematic of a radio network having a plurality of base stations and one mobile object, with an embodiment variant of the method being implemented in the radio network.

DETAILED DESCRIPTION

The method according to various embodiments serves to process measurements of features of a radio network that includes a plurality of base stations and one or more mobile objects, with measurements being performed for a respective mobile object. Each measurement is therein assigned to a base station and describes a feature of a field transmitted by the respective mobile object at the associated base station and/or a field transmitted by the associated base station at the respective mobile object.

The method employs a plurality of evaluation units which communicate with the base stations and are networked with them on the basis particularly of a communication network.

Said communication network can be formed by the radio network whose features are being processed or, as the case may be, can be an additional wireless and/or wired communication network. Each evaluation unit is therein assigned at least one base station of the radio network, meaning that an evaluation unit can be responsible for just one base station or, as the case may be, also for a group of several base stations.

Within the scope of evaluating based on the method according to various embodiments, for a respective mobile object one base station is first selected at a step a) from the plurality of base stations in such a way as to ensure reception of the field transmitted by the respective mobile object at the selected base station and/or reception of the field transmitted by the selected base station at the respective mobile object. Measurements assigned to base stations that receive the field transmitted by the respective mobile object and/or whose field is received by the respective mobile object are then at a step b) conveyed to the evaluation unit assigned to the selected base station.

The evaluation unit assigned to the selected base station evaluates the conveyed measurements at a step c), or said evaluation unit specifies an evaluation unit for evaluating the conveyed measurements, whereupon the conveyed measurements will be evaluated in the specified evaluation unit. The evaluation unit may therein possibly specify itself for evaluating the conveyed measurements.

The method according to various embodiments is characterized in that the respective evaluation units are used as a function of the mobile object's location always for locally evaluating the features of the field in the area around the mobile object. That is achieved by first selecting a base station that is certain to allow radio signals to be exchanged between the base station and mobile object. The evaluation unit assigned to said base station will then serve for evaluating or, as the case may be, will delegate the evaluating of measurements specifically of base stations that receive fields from the mobile object at its momentary location or, as the case may be, whose fields are received by the mobile object at the momentary location. It is hence ensured according to various embodiments when the mobile object moves that evaluating of the fields will change from one evaluation unit to another as a function of the object's location so that the radio network's features will be evaluated across all the evaluation units. Further criteria may therein possibly undergo another check in the evaluation unit assigned to the selected base station. Said further criteria take account particularly of whether the evaluation unit is suitable for evaluating the signals. Said further criteria can, for example, take the resources available on the evaluation units into account in such a way that those having more resources are more likely to be specified for evaluating the measurements. What is to be understood by resources are therein particularly the memory or, as the case may be, computing capacities available in the respective evaluation unit. What can be achieved thereby is that an evaluation unit no longer having sufficient capacity for evaluating the measurements will be replaced by another evaluation unit having a higher capacity or, as the case may be, free resources.

The term "evaluation unit" is to be understood in a broad sense according to various embodiments. For example the evaluation unit can include a corresponding computing unit inside the respective base station. The evaluation unit can therein be formed by the base station's main processor, although it is possible also for an additional computing unit for evaluating the measurements to be integrated in each base station. Each base station can also be assigned a separate evaluation unit not integrated in the base station. It is not generally necessary to couple an evaluation unit to an individual base station. Rather it is possible also for separate computing units to be used that are assigned to several base stations.

The method according to various embodiments can be employed for any fields of radio networks in the form of local or possibly also non-local wireless networks. Preferably fields of a WLAN network and/or DECT network and/or mobile-radio network are evaluated by means of the method. Any measured features of the fields can also be evaluated such as, for example, the features already described in the introduction based on signal strengths and/or propagation times and/or propagation angles of the fields in the radio network. If signal strengths are employed as features, a base station's measurement will describe in particular the signal strength of the field transmitted by the respective mobile object at the base station and/or of the field transmitted by the base station transmitted at the respective object.

The selecting of a base station at step a) of the method according to various embodiments can be done in any way; all that is necessary is to ensure that radio signals can be exchanged between the selected base station and respective mobile object. It is though, preferable also for good reception of the radio network's fields to be ensured in the base station or, as the case may be, mobile object. In an embodiment variant the base station with which the respective mobile object is associated in the radio network is therefore selected at step a). The process of associating is a customary mechanism in radio networks. In the radio network the mobile object therein constitutes what is termed a client which for wirelessly exchanging data searches for a base station within its range that has good reception. In a WLAN network the client is in particular a mobile, portable terminal that has WLAN functionality and associates itself with a base station in the form of a corresponding access point. In a mobile radio network the client is a corresponding mobile telephone which for exchanging data associates itself with a base station within its range. Associating serves in a radio network to ensure that the data requiring to be transmitted will always be conveyed between the client and associated base station, with those signals being ignored by other base stations in the radio network that are likewise able to receive radio signals of the client. The above-described association between a mobile object and base station constitutes a very simple and efficient variant of selecting a base station because recourse can be had to already known mechanisms within the scope of communication in a radio network.

In another variant of the method according to various embodiments in the case of which a measurement of a base station includes a feature—measured by the base station—of a field transmitted by the respective mobile object at the base station, neighborhood lists are used by means of which it is ensured that measurements will be conveyed to the selected base station's evaluation unit. A respective base station therein administers a neighborhood list containing base stations which according to a neighborhood criterion are adjacent to the respective base station.

The neighborhood criterion for generating the neighborhood lists is in an embodiment defined such that a respective base station's neighborhood list will contain all the base stations whose respective reception-range area for the respective mobile object's field overlaps the respective base station's reception-range area for the respective mobile object's field. The neighborhood list can in another embodiment variant contain the base stations located within a defined radius around the base station that administers the neighborhood list, in particular within an estimated range of the mobile object's radio signals for reception by said base station, for example within a 100 m radius. Measured or, as the case may be, modeled characteristics of the distribution of signals around the respective base station may possibly also be taken into account in determining the neighborhood list so that particularly base stations which though close to the mobile object are unable to receive its signal owing to specific spatial factors will not be included in the neighborhood list.

The above-described neighborhood lists are in an embodiment variant employed in combination with selecting a base station based on the association between a mobile object and base station. Whether a base station or, as the case may be, which base station in the neighborhood list is associated with the respective mobile object is therein filed in the neighborhood list of a respective base station. Within the scope of said embodiment variant, a respective base station will send all the base stations in its neighborhood list a message if the respective mobile object and respective base station are associated, as a result of which the base stations in the neighborhood list will be informed of which base station is the selected base station. A respective base station will furthermore convey a feature it has measured of the field transmitted by the respective mobile object to the base station in its neighborhood list which according thereto is associated with the mobile object if the neighborhood list includes a base station associated with the mobile object. It is thereby ensured that the base-station measurements will always be conveyed to the selected base station which is that associated with the respective mobile object.

The neighborhood lists will according to another embodiment be used for selecting a base station even if the mobile object is not associated with a base station or, as the case may be, if a criterion other than association is to be used for selecting. When measuring a feature of the field transmitted by the respective mobile object, a respective base station will therein inform all the base stations in its neighborhood list about the mobile object's presence and the measured feature, whereupon as the selected base station a base station will be specified from among the base stations which measure a feature of the field transmitted by the respective mobile object. Selecting can be based on a decentralized negotiation algorithm between the base stations. The base station specified as the one selected will therein be in particular the base station that has measured the greatest signal strength of the field transmitted by the respective mobile object. Each base station will therein check how great the signal strengths are according to the other base stations' features conveyed to it compared with the signal strength it itself has measured. If a base station determines that its measured signal strength is the greatest, it will declare itself to be the selected base station and inform the other base stations accordingly, whereupon the other base stations will not be allowed to declare themselves to be the selected base station.

The mechanism just described of negotiating a selected base station will be a potential option particularly when a base station is to be selected based on an association but there are no base stations associated with the respective mobile object. A respective base station will in that variant only inform all the base stations in its neighborhood list about the mobile object's presence and the measured feature if its neighborhood list does not contain any base stations associated with the respective mobile object.

An especially simple implementation of the method according to various embodiments can be achieved if a measurement of a base station includes a feature—measured by the respective mobile object—of a field transmitted by the base station at the respective mobile object. That is because the measurements do not in that case have to be conveyed by the base stations to the selected base station but, instead, the features measured in the respective mobile object can be conveyed by the mobile object to the evaluation unit assigned to the selected base station. That embodiment will preferably be combined with the embodiment variant in the case of which the selected base station is the base station associated with the mobile object. In that case the information about the selected base station will be directly available to the mobile object because of the association status. The mobile object can, for example, request the connection parameters for accessing the assigned evaluation unit (IP address, port, password and suchlike, for instance) from the associated base station and then send the measurements directly to the evaluation unit. The evaluation unit provided for evaluating the measurements can also request the measurements directly from the mobile object. It is furthermore possible for the selected base station first to retrieve the measurements from the mobile object and then convey them to the corresponding evaluation unit. The base station may possibly also buffer the measurements for later use.

Configuration data required for evaluating the measurements is in a further embodiment distributed locally among the evaluation units so that each evaluation unit will contain at least the configuration information which it requires for evaluating the conveyed measurements. Memory space can be saved in the individual evaluation units through said distributing of the configuration information because configuration information for the entire radio network will not have to be held by every evaluation unit. The configuration data therein includes in particular the relevant feature maps, signal models, and locations of the base stations in the respective neighborhood list and suchlike. The configuration information can be stored on the evaluation unit within the scope of said unit's preconfiguring. The configuration data can therein be conveyed to the corresponding evaluation unit my means of a corresponding data transfer, for example via a memory card or through retrieval from a central data server. There is also the possibility, where applicable, of each evaluation unit's at least partially learning its configuration information itself, which can be the case with, for example, the techniques described in the introduction for learning feature maps.

Various evaluations can be performed in the corresponding evaluation unit using the measurements conveyed within the scope of the method according to various embodiments. The measurements can in particular be evaluated in such a way that the respective mobile object's location will be determined and/or at least a part of a feature map will be generated and learned in particular based on a learning technique, with the feature map—for a plurality of grid points in the room—indicating the radio network's features when the respective mobile object is located at the grid point. In particular the techniques described in publications [1] to [3] cited in the introduction can be used as learning techniques for learning a feature map in the form particularly of a field-strength map having signal field strengths as features.

Each evaluation unit is in an embodiment variant responsible for a defined partial area of the feature map, meaning that each evaluation unit generates or, as the case may be, learns the feature map in the corresponding defined partial area. The defined partial areas therein preferably at least partially overlap, with evaluation units that are responsible for mutually overlapping partial areas exchanging their evaluations in the partial areas' overlap zones, with one evaluation unit taking account of the evaluations originating from another evaluation unit in the overlap zone when the feature map is being generated. For example each evaluation unit can be assigned a learning area in which the feature map is learned. A learning step of the method is performed each time an evaluation unit then receives the measurements made at a predetermined instant from other evaluation units, whereupon the learning area will contain an updated feature map. The measurement data can therein possibly also first be buffered for processing later so that a larger amount of measurement data can be processed at once.

As just described, it is possible in the case of overlapping partial areas for the evaluations from the overlap zones to be exchanged among the evaluation units. When a feature map is being learned, for example the features at the grid points in the overlap zone that were determined by one evaluation unit can be combined with the features at the same grid points zone that were determined by another evaluation unit in such a way that a mean value is formed from said features and each evaluation unit uses said mean value at the corresponding grid points in the feature map in the partial area assigned to it.

In another embodiment, one or more interfaces are provided via which the evaluation units' evaluations can be suitably retrieved by users or, as the case may be, external computers. An interface of said kind can be embodied as a central computer, for instance, with its being possible to retrieve the evaluation units' evaluations by intermediately connecting the central computer. The central computer can therein, for example, process an external computer's request to locate a specific mobile object in such a way that said request will be forwarded to the evaluation unit that is in the process of evaluating the measurements relating to said mobile object. Said evaluation unit can then convey the required information to the external computer either directly or via the central computer after it has been intermediately connected. It is possible also for the evaluation units' evaluations always to be stored on the central computer, too, so that the requested information will be made available directly in the central computer.

Evaluations can in another embodiment be retrieved on a decentralized basis too. For example the evaluation units can form a peer-to-peer network, with its being possible via requests to the peer-to-peer network for the requested evaluations to be retrieved using mechanisms known per se of networks of such kind.

Apart from the above-described method, the various embodiments relate further to a communication network for the computer-supported processing of measurements of features of a radio network, with the communication network including a plurality of base stations and one or more mobile objects. The plurality of base stations and the mobile object(s) therein form the radio network and measurements are performed for a respective mobile object while the radio network is operating, with each measurement being assigned to a base station and describing a feature of a field transmitted by the respective mobile object at the associated base station and/or of a field transmitted by the associated base station at the respective object. The communication network includes a plurality of evaluation units networked with the base stations, with each evaluation unit being assigned one or more base stations of the radio network. The communication network is therein embodied such that each variant of the method according to various embodiments described in the foregoing can be implemented in the communication network.

FIG. 1 shows a radio network based on a WLAN network having nine base stations AP1, AP2, . . . , AP9 in the form of what are termed access points. Each base station therein contains a corresponding antenna for receiving or, as the case may be, transmitting radio signals within the WLAN network. Moving in the radio network is a mobile object O that likewise has a corresponding antenna by means of which radio signals can be received or, as the case may be, transmitted in the radio network.

The radio network is in the embodiment variant shown in FIG. 1 employed for localizing mobile object O. The field transmitted by mobile object O is used for that purpose, which field is received by the respective base stations within range of the mobile object. The individual base stations therein measure the signal strength of the field of moving mobile object O and the location of mobile object O can then be computed using methods known per se based on a plurality of signal strengths measured by different base stations. The registered measurements can possibly be used also for learning a corresponding map which for a multiplicity of grid points within the radio field's spatial range in each case indicates the signal strengths that can be expected at the individual base stations when the mobile object is situated on a corresponding grid point.

Mobile object O is in the scenario shown in FIG. 1 situated where base stations AP1, AP2, AP3, AP4, and AP5 are within range of the radio signals of object O.

Base stations AP6, AP7, AP8, and AP9 are by contrast unable to receive the radio signals owing to being too far from object O. It is indicated in FIG. 1 by means of corresponding double arrows P1, P2, P3, P4, and P5 that corresponding base stations AP1, AP2, AP3, AP4, and AP5 are within radio range of mobile object O. With conventional localizing methods known from the prior art, the individual signal-strength measurements in base stations AP1 to AP5 will be transmitted to a central evaluation unit which then determines the location of object O based on known methods. That has the disadvantage that all the information registered in the radio network will be lost should the evaluation unit suffer an outage. Problems can moreover arise when the radio network is expanded to include new base stations because the resources in the central evaluation unit may then in certain circumstances no longer suffice to perform the relevant computations owing to the increased number of measurements.

To obviate the disadvantages just described, in the embodiment variant shown in FIG. 1 a multiplicity of evaluation units assigned the reference numerals/letters AU1, AU2, . . . , AU9 are used. Each of said evaluation units has been assigned to a corresponding base station AP1, AP2, . . . , AP9. Evaluation units AU1 to AU9 are therein all networked, although networking is not indicated in FIG. 1 for reasons of clarity. Networking can therein again be achieved wirelessly via a corresponding WLAN network, or else via a wired network in the form of, for example, a LAN network. A central computer R is furthermore integrated in said network, although networking of the computer with the evaluation units has again not been indicated for reasons of clarity. The function of said computer R is explained in more detail further below.

In the method's embodiment variant described here, an evaluation unit which evaluates the signal strengths of the radio signals of object O that are received in the base stations is determined by way of the association of mobile object O with one of the base stations within the object's radio range. Mobile object O therein constitutes a client in the radio network, which client associates itself with one of the base stations within its range for data communication. The client will then in an ensuing data communication communicate only with the associated base station and the other base stations within the client's range will ignore the data transmitted over the radio network. The association process is sufficiently known from local radio networks such as, for example, WLAN networks or, as the case may be, DECT networks. A corresponding association takes place also in non-local radio networks, for example mobile radio networks. The other base stations will no longer be able to communicate with a mobile object once its association with one base station has been established. An at the current time very good radio link between mobile object O and its associated base station will therein be ensured within the scope of an association.

The mobile object is currently associated with base station AP2 in the scenario shown in FIG. 1, as is indicated by double arrow AS. If having distanced itself from base station AP2 while moving, object O will after a defined period of time finally establish an association with another base station that receives signals of the mobile object O better. The evaluation unit assigned to the currently associated base station will in the embodiment variant described here be selected for evaluating all the base stations within radio range of mobile object O. That means that in the scenario shown in FIG. 1, evaluation unit AU2 of base station AP2 will be specified for evaluating the radio signals of mobile object O that are measured at base stations AP1, AP2, AP3, AP4, and AP5.

In order now to ensure that the measured signal strengths of base stations AP1, AP3, AP4, and AP5 will also reach evaluation unit AU2 alongside the measurements of base station AP2, each base station administers a neighborhood list detailing the base stations in its neighborhood that will have to be informed if the respective base station associates itself with mobile object O. The neighborhood list's contents can therein be determined by, for example, a specific radius around the respective base station, with all the base stations within the radius being listed in the neighborhood list. The radius therein corresponds to, for example, the mobile object's radio range for the respective base station. The radius can also be larger than said radio range, for example twice as large. A corresponding base station's neighborhood list is in a variant compiled such as to contain all base stations whose reception-range area for the mobile object overlaps the corresponding base station's reception-range area. In the embodiment variant shown in FIG. 1, the neighborhood list of base station AP2, which has associated itself with object O, contains base stations AP1, AP3, AP4, and AP5 within range of mobile object O. Based on the neighborhood list in base station AP2, said base station then informs all the base stations in the neighborhood list about the association with mobile object O. That information will be filed in the other base stations' neighborhood lists as the entry for base station AP2. When measurements are performed, each of base stations AP1 to AP5 will then send its measurements to evaluation unit AU2 that is assigned to associated base station AP2. The way that is done is that after a measurement the respective base station checks the neighborhood list to find out with which base station the mobile object is associated and then conveys the measurement to the evaluation unit assigned to the associated base station.

Should the case now arise in the network shown in FIG. 1 that the mobile object does not associate itself with any base station (for example because the mobile object is not authorized to access the base stations' network), the corresponding neighborhood lists can also be used for specifying an evaluation unit in a manner other than that based on an association. That is done by using the strength of a received radio signal of the mobile object as the criterion for selecting an evaluation unit. In the event that a base station measures a signal of a mobile object, the base station will first check whether a base station in its neighborhood list is associated with the mobile object. If none is associated, the base station will send its measured signal strength to all the base stations in the neighborhood list. The correspondingly received signal strengths of the base stations will in that way be distributed among the base stations within range of the mobile object. The base station that received the mobile object's signal most strongly will then be selected from among said base stations. That base station will specify itself as the selected base station and forward that information to the base stations in its neighborhood list, which thereafter will no longer be able to specify themselves as selected base stations. Through the selection of a base station, the evaluation unit assigned to the selected base station will then be responsible for evaluating the measurements. That means the base stations which receive measurements from the mobile object will henceforth send said measurements to the responsible evaluation unit.

To ensure in the embodiment variant of the method according to FIG. 1 that external third-party computers can access the evaluations ascertained on a distributed basis in the individual evaluation units, computer R networked with the evaluation units is used. Said computer contains the relevant information detailing which evaluation unit has evaluated a specific mobile object's radio signals at what instant in time. A corresponding request from an external computer can then be met by the central computer R by retrieving the information from the corresponding evaluation unit.

The method described in the foregoing has a number of advantages. In particular the method undergoes scaling when more base stations are added because more evaluation units will then also be added for evaluating the radio signals in the network. Moreover, not all the data in the network will be lost should an evaluation unit suffer an outage because the evaluation of the measurements is distributed over a multiplicity of evaluation units. The method can be employed for any evaluations of features of a radio network, in particular both for localizing a mobile object and for generating or, as the case may be, learning a feature map. Corresponding partial areas can therein be defined for the feature map, with each evaluation unit being responsible for a corresponding partial area of the feature map.

LIST OF REFERENCES

[1] DE 10 2006 044 293 A1
[2] B. Betoni Parodi, H. Lenz, A. Szabo, H. Wang, J. Horn, J. Bamberger, D. Obradovic: "Initialization and Online Learning of RSS Maps for Indoor/Campus Localization", PLANS 2006-2006 IEEE/ION Position, Location and Navigation Symposium, San Diego, USA, pp 164-172
[3] B. Betoni Parodi, H. Lenz, A. Szabo, J. Bamberger, J. Horn: "Algebraic and Statistical Conditions for Use of SLL", ECC 2007-European Control Conference 2007, Kos, Greece

What is claimed is:

1. A method for computer-supported processing of measurements of features of a radio network including a plurality of base stations, one or more mobile objects, and a plurality of evaluation units the method comprising for a respective mobile object:

selecting from the plurality of base stations a particular base station currently within radio range of the respective mobile object, said radio range of the respective mobile object providing at least one of reception of field transmitted by the respective mobile object at the selected base station and reception of a field transmitted by the selected base station at the respective mobile object;

associating the selected base station with the respective mobile device;

as a result of associating the selected base station with the respective mobile device:

accessing, by the selected base station, a neighborhood list for the selected base station that lists one or more other base stations of the plurality of base stations as neighboring base stations with respect to the selected base station;

informing, by the selected base station, each of the neighboring base stations listed in the accessed neighborhood list of the association between the selected base station and the respective mobile device;

receiving, at a particular evaluation unit assigned to the selected base station, from the selected base station and from each of the neighboring base stations of the selected base station, measurements taken by the neighboring base stations regarding a feature of the field transmitted by the respective mobile object and evaluating, by the particular evaluation unit assigned to the selected base station, the measurements received from the selected base station and from each of the neighboring base stations of the selected base station.

2. The method according to claim 1, wherein fields of at least one of a wireless local area network (WLAN) network, digital enhanced cordless telecommunications (DECT) network, and mobile-radio network are evaluated.

3. The method according to claim 1, wherein at least one of signal strengths, propagation times, and propagation angles of the fields in the radio network are determined via the measurements.

4. The method according to claim 1, wherein the neighborhood list of the selected base station lists base stations which are defined as neighboring base stations with respect to the selected base station according to a neighborhood criterion.

5. The method according to claim 4, wherein the neighborhood criterion is defined such that the neighborhood list of the selected base station contains all the base stations whose respective reception-range area for the field of the respective mobile object overlaps the reception-range area of the selected base station for the field of the respective mobile object.

6. The method according to claim 4, wherein when a respective base station measures a feature of the field transmitted by the respective mobile object, the respective base station will inform all the base stations in its neighborhood list about the presence of the mobile object and about the measured feature.

7. The method according to claim 3, wherein selecting the particular base to associate with the respective mobile device comprises:

each of one or more of the plurality of base stations, upon measuring a signal strength of the field transmitted by the respective mobile object, informing all base stations listed as neighboring stations in neighborhood list for that base station of the presence of the mobile object and the measured feature, and selecting from the one or more the base station having measured the greatest signal strength of the field transmitted by the respective mobile object.

8. The method according to claim 1, wherein the selected base station informs the base stations listed in the neighborhood list about the presence of the mobile object in response to determining that the neighborhood list does not contain any base stations associated with the respective mobile object.

9. The method according to claim 1, comprising selecting the particular evaluation unit assigned to the selected base station from the plurality of evaluation units as a function of one or more resources available on each of the evaluation units.

10. The method according to claim 1, wherein configuration data required for evaluating the measurements is distributed locally among the plurality of evaluation units so that each evaluation unit includes sufficient configuration information for evaluating the measurements received at the selected evaluation unit.

11. The method according to claim 1, wherein the received measurements are evaluated in the particular evaluation unit to determine in such a way that at-a location of the respective mobile object and to generate at least a part of a feature map indicating, for each of a plurality of grid points, features of the radio network when the respective mobile object is located at that grid point.

12. The method according to claim 11, wherein each evaluation unit is responsible for a defined partial area of the feature map and generates a portion of the feature map for said partial area.

13. The method according to claim 12, wherein the defined partial areas at least partially overlap, wherein evaluation units that are responsible for mutually overlapping partial areas exchange evaluations regarding overlap zones.

14. The method according to claim 1, wherein one or more interfaces are provided via which evaluations of the evaluation units are retrievable.

15. The method according to claim 14, wherein evaluations of the evaluation units are retrievable by intermediately connecting a central computer.

16. The method according to claim 14, wherein the evaluation units form a peer-to-peer network and evaluations of the evaluation units are retrievable on a decentralized basis via requests to the peer-to-peer network.

17. The method according to claim 1, wherein measurements of base stations are evaluated via evaluation units that are each assigned to and part of an individual base station.

18. A communication network for computer-supported processing of measurements of features of a radio network, the communication network including:

a plurality of base stations, one or more mobile objects, and a plurality of evaluation units networked with the base stations, each evaluation unit being assigned one or more base stations of the radio network, wherein, for a respective mobile object, the communication network is configured to select from the plurality of base stations a particular base station currently within radio range of the respective mobile object, said radio range of the respective mobile object providing at least one of reception of a field transmitted by the respective mobile object at the selected base station and reception of a field transmitted by the selected base station at the respective mobile object;

wherein the selected base station includes logic instructions stored in non-transitory computer-readable media and executable by a processor to, as a result of associating the selected base station with the respective mobile device:

access a neighborhood list for the selected base station that lists one or more other base stations of the plurality of base stations as neighboring base stations with respect to the selected base station; and inform each of the neighboring base stations listed in the accessed neighborhood list of the association between the selected base station and the respective mobile device;

wherein an evaluation unit assigned to the selected base station includes logic instructions stored in non-transitory computer-readable media and executable by a processor to:
  receive, from the selected base station and from each of the neighboring base stations of the selected base station, measurements taken by the neighboring base stations regarding a feature of the field transmitted by the respective mobile object; and
  evaluate the measurements received from the selected base station and from each of the neighboring base stations of the selected base station.

19. The communication network according to claim 18, wherein the fields of at least one of a wireless local area network (WLAN) network, digital enhanced cordless telecommunications (DECT) network, and mobile-radio network are evaluated.

* * * * *